April 6, 1937. A. G. NESFIELD 2,076,247
CONTROLLING DEVICE FOR OPERATING A PLURALITY OF RECIPROCATING MEMBERS
Original Filed March 16, 1933 6 Sheets-Sheet 1

INVENTOR
Arthur Georges Nesfield
BY
ATTORNEY

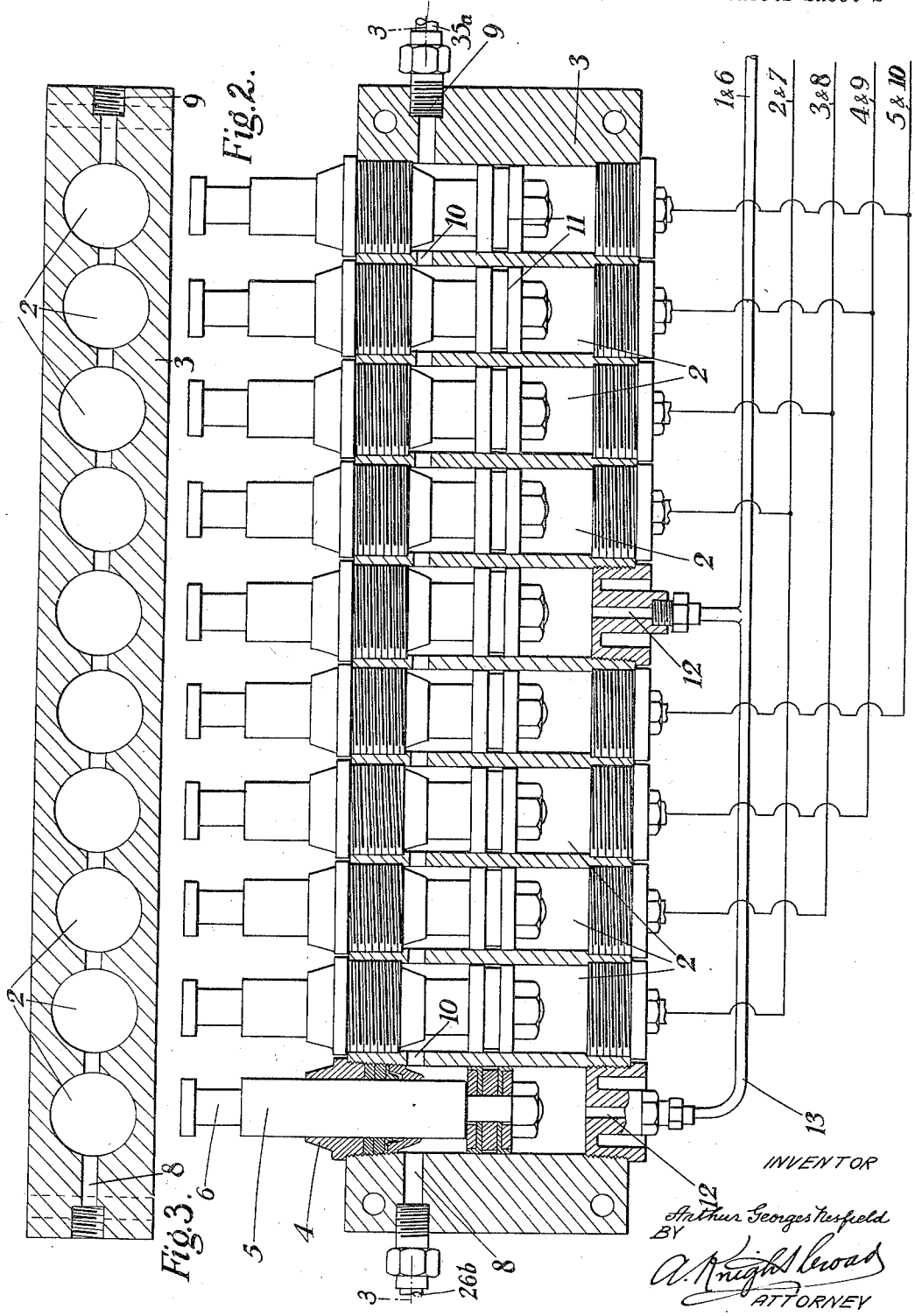

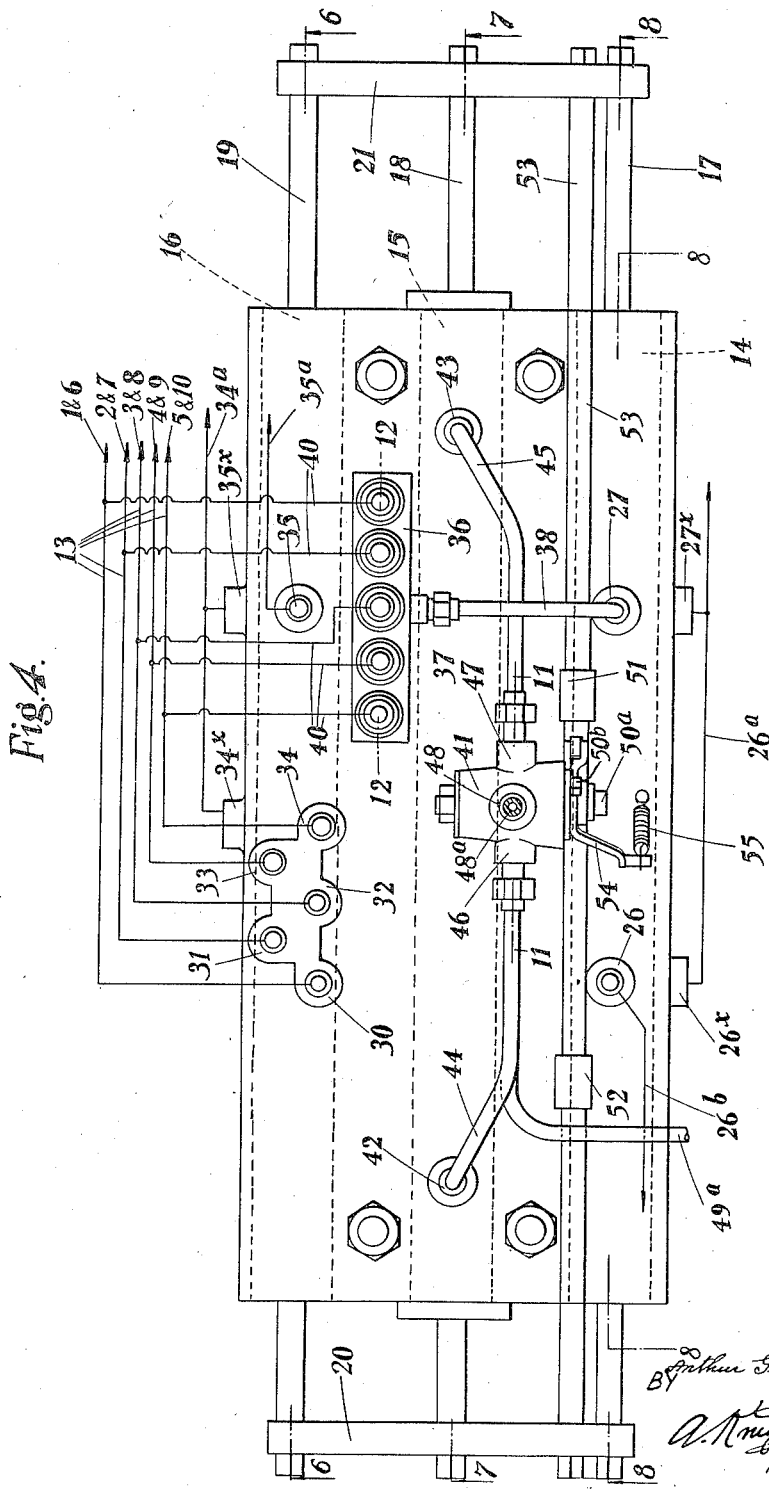

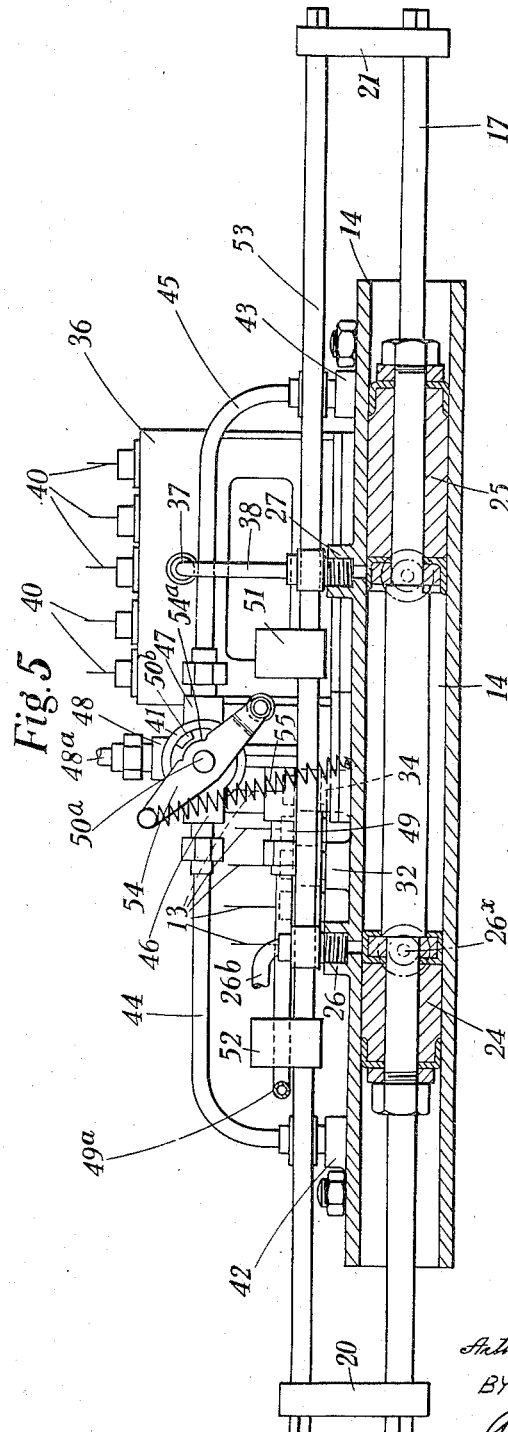

April 6, 1937. A. G. NESFIELD 2,076,247
CONTROLLING DEVICE FOR OPERATING A PLURALITY OF RECIPROCATING MEMBERS
Original Filed March 16, 1933  6 Sheets-Sheet 5
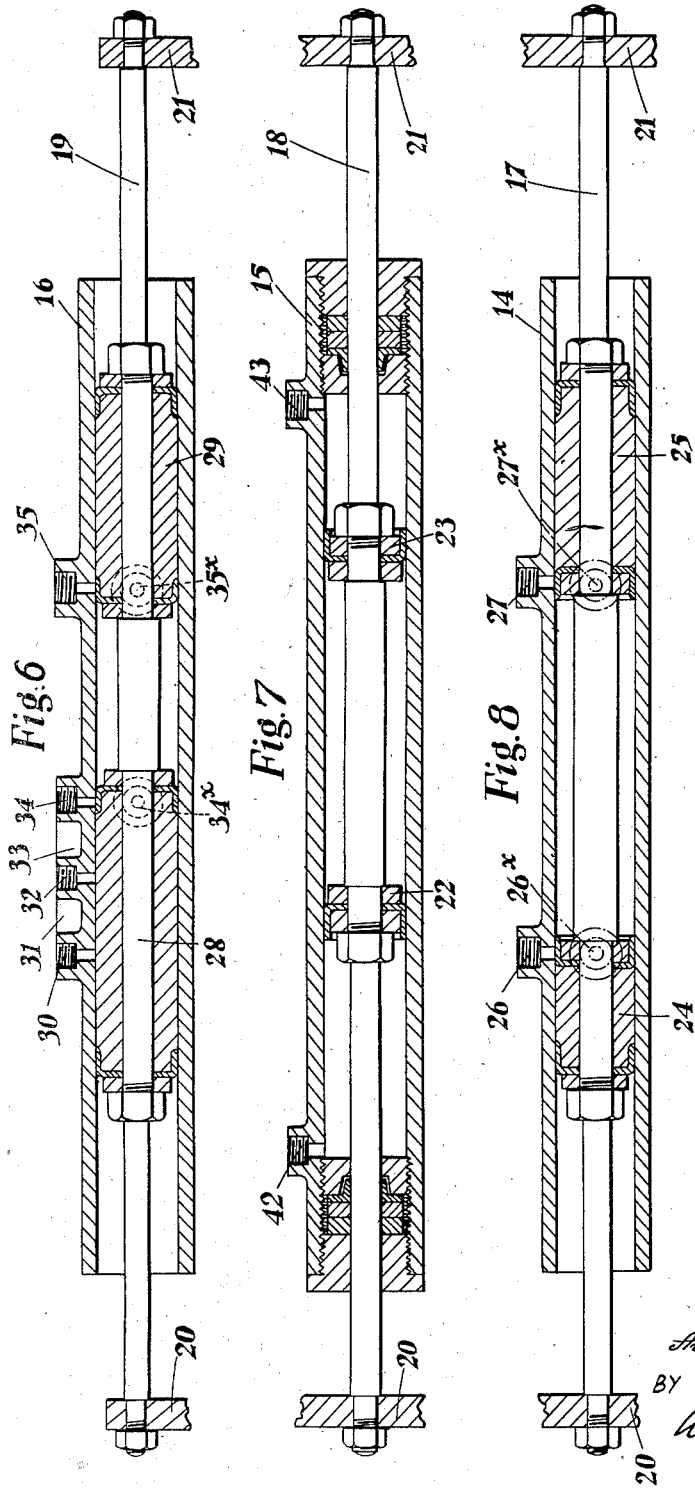
INVENTOR
Arthur Georges Nesfield
BY
ATTORNEY

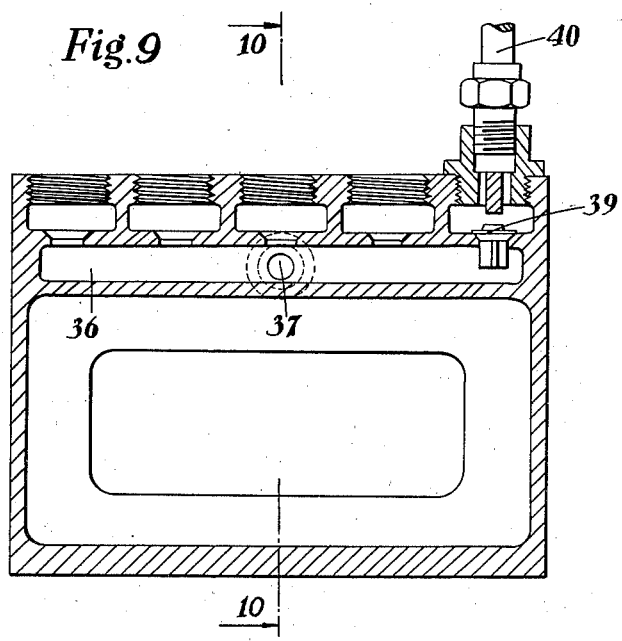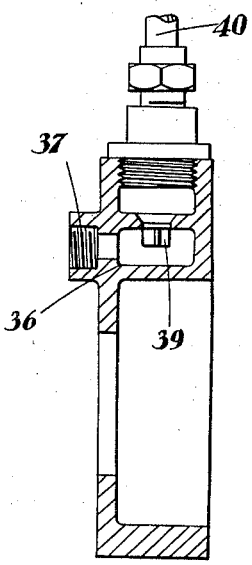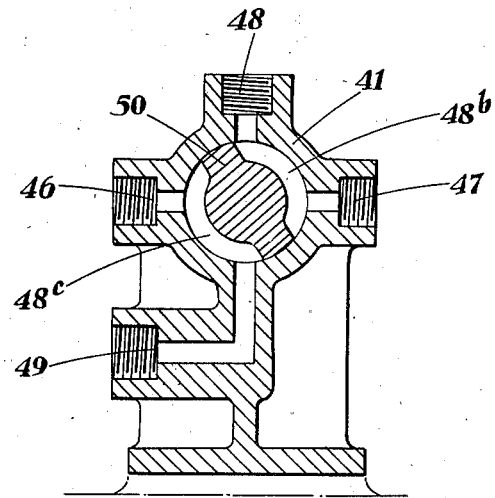

Patented Apr. 6, 1937

2,076,247

UNITED STATES PATENT OFFICE 2,076,247

CONTROLLING DEVICE FOR OPERATING A PLURALITY OF RECIPROCATING MEMBERS

Arthur Georges Nesfield, Fetcham, Leatherhead, England

Original application March 16, 1933, Serial No. 661,908. Divided and this application May 29, 1935, Serial No. 24,085. In Great Britain March 16, 1932

2 Claims. (Cl. 121—147)

This invention relates to a controlling device for operating a plurality of reciprocating members, and will be described with particular reference to its application for operating furnace bars or grates of the reciprocating type and it has for its object to provide hydraulic means for reciprocating said bars, said hydraulic means being so arranged that the bars are drawn forwardly in groups in a predetermined sequence and pushed backwardly into the furnace simultaneously, and to this end the device comprises a plurality of double acting hydraulic cylinders and pistons, one of each of said pistons being removably and loosely connected to the end of one of the fire bars, said fire bars being operatively arranged in a plurality of associated groups, each of said cylinders being connected to a master control valve suitably connected to a source of water supply under pressure.

This application is a division of my application Serial Number 661,908, filed March 16, 1933.

In the accompanying drawings which illustrate this invention:—

Figure 2 is a horizontal section partly diagrammatic on line 2—2 of Figure 1 through the fire bar cylinders;

Figure 3 is a vertical section on line 3—3 of Figure 2 with the pistons removed;

Figure 4 is a plan partly diagrammatic of the controlling valve;

Figure 5 is a side elevation thereof partly in section on line 5—5 of Figure 4;

Figure 6 is a vertical section on line 6—6 of Figure 4;

Figure 7 is a vertical section on line 7—7 of Figure 4;

Figure 8 is a vertical section on line 8—8 of Figure 4;

Figure 9 is a sectional elevation on line 9—9 of Figure 4 on an enlarged scale of the valve box showing but one valve in position;

Figure 10 is a section on line 10—10 of Figure 9;

Figure 11 is a section on line 11—11 of Figure 4 on an enlarged scale;

Figure 1:
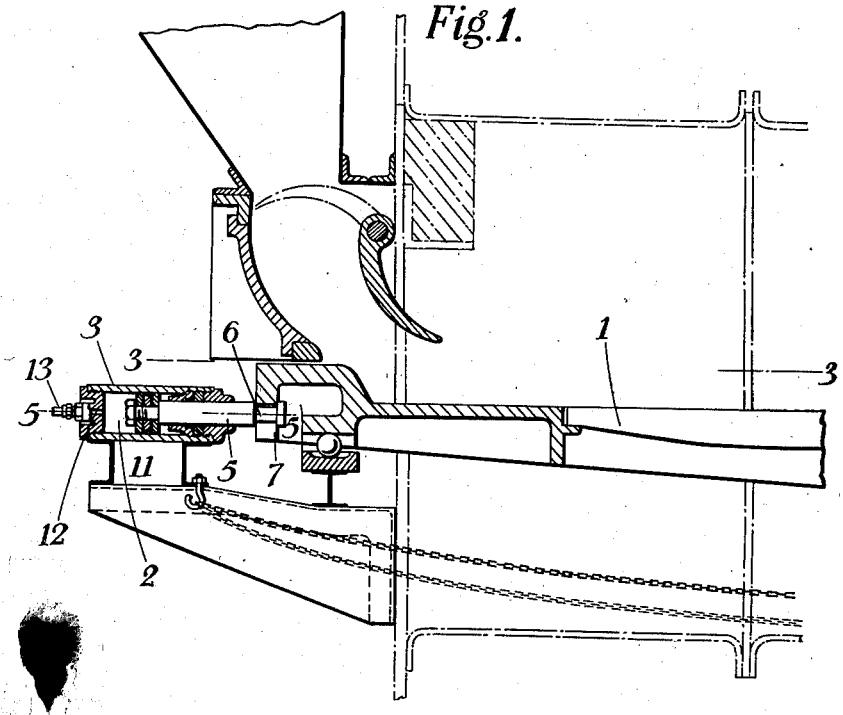
Figure 1 is a substantially longitudinal vertical sectional view partly diagrammatic of one side of a furnace.

According to the embodiment of the invention which will be described with reference to a furnace having a bank of ten fire bars 1 operating in pairs as indicated in Figure 2, the hydraulic cylinders 2 (hereinafter referred to as the fire bar cylinders) being of small bore and arranged in close relationship with each other are preferably formed in a mono-block casting 3. The inner end of each cylinder 2 is closed by means of a gland 4 in which the piston rods 5 reciprocate; the outer end of each of said piston rods is furnished with a groove 6 adapted to engage with an open ended slot 7 formed in the front of the fire bar 1, said slot being of such a size as to permit flexibility in all directions. The cylinder block is provided at one end with an inlet port 8 and at the other end with an exhaust or outlet port 9, both of said ports being made common to all the cylinders 2 by the provision of the ports 10 in the walls of the several cylinders, the ports 8, 9 and 10 being disposed in close proximity to the inner ends of the glands 4 as shown in Figure 3, the arrangement being such that the pistons 11 cannot pass or close said ports. The outer ends of the cylinders 2 are furnished with individual ports 12 to which are connected pipes 13 leading directly to the master control valve hereinafter described, said pipes being arranged singly or in groups depending on the number of bars which it is desired to pull forward at the same time; in the drawings (Figures 2 and 4) cylinders 1 and 6; 2 and 7, 3 and 8; 4 and 9; and 5 and 10 respectively are arranged to operate together.

The master control valve as illustrated in Figures 4 to 11 comprises three cylinders 14, 15 and 16, arranged parallel to each other, provided with reciprocating piston rods 17, 18 and 19 respectively, each of which is provided with two pistons. The piston rods are connected together at each end by cross-bars 20, 21. The centre or operating cylinder 15 is a simple cylinder and the pistons 22, 23 and piston rod 18 operating therein, by means of the cross-bars 20, 21, impart motion to the piston rods 17 and 19 operating in the cylinders 14 and 16, the former arranged to control the pressure in and the latter the exhaust from the fire bar cylinders 2.

The pressure cylinder 14 is fitted with two pistons 24, 25 which open and close alternately ports 26, 27, which admit the operating liquid, supplied to the cylinder through the ports $26^x$ and $27^x$, to the inlet port 8 and ports 12 at the front and back ends respectively of the fire bar cylinders 2. The exhaust cylinder 16 is of similar construction and has two pistons 28, 29 for controlling the exhaust or fluid from outlet port 9 and ports 12 at the back and front ends respectively of the fire bar cylinders 2, in the manner more fully described in the description of the operation.

The piston 28 of the exhaust cylinder 16 controls a series of ports 30, 31, 32, 33 and 34 connected in pairs as above described to the ports 12, which ports are arranged to open in sequence so that the fire bars 1 may move forwardly in a predetermined sequence. The ports 30 to 34 exhaust finally through port $34^x$ and pipe $34^a$ to a common exhaust. The piston 29 of the exhaust cylinder controls a single port 35 which is connected to the outlet port 9 through which the inner ends of the fire bar cylinders are exhausted simultaneously. The port 35 exhausts finally through port $35^x$ and common exhaust through pipe $34^a$. The pistons in both the cylinders 14 and 16 are made sufficiently long to cover the ports to ensure a correct sequence of operations and prevent the undesirable circulation of water during the period the bars are moving.

A common valve box 36 is connected at 37 by a pipe 38 to the port 27 of the pressure cylinder 14, said valve box, which is provided with non-return valves 39, as shown on an enlarged scale, with but one valve in position, in Figures 9 and 10, being connected by pipes 40 to the pipes 13 connected to the ports 12. The object of said valves is to prevent a short circuit between the front ends of the fire bar cylinders when exhausting through the ports 30 to 34.

As the pistons in the operating cylinder 15 are operated hydraulically, and, as is well known, liquids have negligible expansion, the difficulty arises of providing means to enable the pistons in this cylinder to pass the dead centre and thereby obtain a correct reversal of motion at each end of the stroke, and to this end a rocking valve 41, such as that illustrated on an enlarged scale in Figure 11, is provided. The ports 42 and 43 of the cylinder 15 are connected by the pipes 44 and 45 to the ports 46 and 47 respectively of the valve 41, which valve is also furnished with a pressure inlet port 48 and an exhaust port 49 to which the inlet pipe $48^a$ and exhaust pipe $49^a$ respectively are connected.

To overcome the dead centre difficulty above referred to the valve is provided with a type of lost motion whereby no motion is imparted to the rotary member 50 of the valve until a tappet 51 or 52 mounted on a rod 53, the ends of which are connected to the cross-bars 20, 21, has pushed the operating lever 54 secured to a pin $50^a$ on the outer end of the member 50 over its own dead centre, and at this point a spring 55 acts to pull said lever and thereby one of the ends of the cut-out arc $54^a$ on the side edge of the lever against the lug $50^b$ rigid with the member 50, the continued movement of the lever under the action of the spring snaps the member 50 into the reverse position.

For the provision of the necessary liquid for operating the fire bar pistons and the valve in the case of grates attached to boilers and the like, said liquid is taken from the boiler feed pump by means of a suitable connection, the exhaust of the fire bar cylinders through the ports $34^x$ and $35^x$ and the pipe $34^a$ and the exhaust from the operating cylinder through the port 49 and pipe $49^a$ being returned to the hot well.

Assuming the parts are in the position shown in Figures 4 to 8 the operation of the controlling valve is as follows:—

Pressure water from the feed pump is passing through the pipe $48^a$, inlet port 48, channel $48^b$, port 47, pipe 45 and port 43 into the cylinder 15 to the right of the piston 23; said piston and the rod 18 by which it is carried will thus move to the left together with the pistons in the pressure and exhaust cylinders 14 and 16 respectively. As the right hand end of the piston 28 passes the ports 34 to 30 connected in pairs by the pipes 13 to the ports 12, said ports 34 to 30 are open to the exhaust port $34^x$ and exhaust pipe $34^a$ in the predetermined sequence. Simultaneously with this action the pressure water supplied by the feed pump through the pipe $26^a$ to the port $26^x$ passes from the cylinder 14 through port 26 and pipe $26^b$ to the inlet port 8 and fire bar cylinders 2 so that as the cylinders become open to the exhaust through the ports 12 the pressure through 8 forces the pistons 11 and thereby the fire bars forwardly in sequence.

The piston rod 18 has now reached the end of its stroke to the left and the tappet 51 has, by striking the arm 54, turned the rotary member 50 of the valve 41 into the reverse position so that the pressure water passes through the pipe $48^a$, inlet port 48, channel $48^c$, port 46, pipe 44 and port 42 into the cylinder 15 to the left of the piston 22; said piston and the rod by which it is carried will thus move to the right together with the pistons in the pressure and exhaust cylinders 14 and 16 respectively. As the piston 28 moves to the right it closes the ports 30 to 34 in the predetermined sequence in the reverse order, and simultaneously with the closure of the ports 34 and $34^x$ the piston 24 closes the ports 26 and $26^x$. The parts have now reached the position shown in Figures 6 to 8. The piston rod and connected parts now continue the movement to the right and as the piston 29 in the exhaust cylinder 16 passes beyond the ports 35 and $35^x$ the pressure water in the inner ends of all the fire bar cylinders passes through the outlet port 9, pipe $35^a$, ports 35 and $35^x$ to the common exhaust pipe $34^a$. Simultaneously with this action, pressure water passes through the pipe $26^a$, ports $27^x$ and 27, pipe 38, connection 37 to valve box 36, through all the valves 39 therein, pipes 40 and 13 to the ports 12 at the front ends of the fire bar cylinders 2 thereby pushing the whole of the pistons rearwardly simultaneously.

The piston rod 18 has now reached the end of its stroke to the right and the tappet 52 has, by striking the arm 54, turned the rotary member 50 of the valve 41 into the position shown in Figure 11 so that the pressure water again passes through the pipe $48^a$, inlet port 48, channel $48^b$, port 47, pipe 45 and port 43 into the cylinder 15 to the right of the piston 23, which is moved to the left together with the pistons 25 and 29 which thereby close the ports 27, $27^x$ and 35, $35^x$. The parts are now in the position shown in Figures 4 to 8.

The use of the boiler feed pump for supplying the operating liquid as above described establishes a definite relation between the feed or the evaporation capacity of the boiler and the rate of travel of the grates or the combustion of the fuel, and enables a unity of control to be maintained thereby ensuring the correct relation between the feed and the fuel and the working of the boiler at the highest possible efficiency.

When the controlling device herein described is employed to control the reciprocating bars of distilling retorts, the boiler providing the steam for distillation purposes also provides steam for operating a steam pump of standard design for pumping the water into the hydraulic cylinder of the controlling device.

The master valve herein described may be arranged to operate the whole of the grates of a battery of boilers, thus ensuring synchronous operation and the equal distribution of load on the several boilers.

What I claim is:—

1. Controlling device for operating a plurality of reciprocating members comprising a plurality of double acting hydraulic cylinders and pistons, one of each of said pistons being removably and loosely connected to the end of one of each of said reciprocating members, the respective ends of said hydraulic cylinders being connected to a master control valve itself connected to a source of water supply under pressure whereby said reciprocating members are moved simultaneously in one direction and in associated groups in the reverse direction, the connections between the respective ends of the hydraulic cylinders and master control valve being so arranged that the pressure fluid is simultaneously exhausted from the rear ends of each of said hydraulic cylinders whereby the pistons in all of said cylinders are pushed rearwardly simultaneously by the pressure fluid in the front ends of said cylinders and that said pistons are pushed forwardly in a predetermined sequence by exhausting the pressure fluid from the front ends of associated groups of said cylinders, the pistons in the cylinders of other associated groups being positively held against movement by the pressure fluid.

2. Controlling device for operating a plurality of reciprocating members comprising a plurality of double acting hydraulic cylinders and pistons, one of each of said pistons being removably and loosely connected to the end of one of each of said reciprocating members, the respective ends of said hydraulic cylinders being connected to a master control valve itself connected to a source of water supply under pressure whereby said reciprocating members are moved simultaneously in one direction and in associated groups in the reverse direction, the master control valve comprising a double acting operating cylinder, a double acting pressure cylinder, a double acting exhaust cylinder, a pair of pistons in each of said cylinders, means connecting the piston rods of the pressure and exhaust cylinders to the piston rod of the operating cylinder, a plurality of valves in said exhaust cylinder connected to the front ends of said double acting hydraulic cylinders controlled by one of the pair of pistons therein, said valves corresponding in number with the number of associated groups in which the double acting hydraulic cylinders are arranged, a single exhaust valve in said exhaust cylinder controlled by the other of the pair of pistons therein, said valve being connected to the rear ends of each of said double acting hydraulic cylinders, a common valve box, a plurality of non-return valves therein connected to and corresponding in number with the number of associated groups of double acting hydraulic cylinders, a port in the pressure cylinder connected to the rear ends of said double acting hydraulic cylinders, a second port in said pressure cylinder connected to the common valve box, a three-way cock controlling the supply of pressure fluid to each end of the operating cylinder and means on the piston rod of said operating cylinder for reversing the direction of flow of said pressure fluid through said three-way cock.

ARTHUR GEORGES NESFIELD.